(12) United States Patent
Chu et al.

(10) Patent No.: US 10,190,532 B2
(45) Date of Patent: Jan. 29, 2019

(54) AIR INTAKE STRUCTURE FOR VEHICLE ENGINE

(71) Applicants: Hyundai Motor Company, Seoul (KR); KIA Motors Corporation, Seoul (KR)

(72) Inventors: Dong Ho Chu, Ansan-si (KR); Yang Geol Lee, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/230,553

(22) Filed: Aug. 8, 2016

(65) Prior Publication Data

US 2017/0284332 A1 Oct. 5, 2017

(30) Foreign Application Priority Data

Apr. 5, 2016 (KR) ........................ 10-2016-0041602

(51) Int. Cl.
*F02M 35/10* (2006.01)
*F02F 1/42* (2006.01)
(Continued)

(52) U.S. Cl.
CPC .............. *F02F 1/425* (2013.01); *F02B 31/04* (2013.01); *F02D 41/0002* (2013.01);
(Continued)

(58) Field of Classification Search
CPC ...... F02D 41/0002; F02F 1/425; F02B 31/04; F02M 35/10255; F02M 35/10262; F02M 35/10301
(Continued)

(56) References Cited

U.S. PATENT DOCUMENTS 5,551,392 A * 9/1996 Yamaji .................... F02B 23/08
123/188.14
5,913,298 A * 6/1999 Yoshikawa ............. F01L 1/344
123/306
(Continued)

FOREIGN PATENT DOCUMENTS

JP 08296535 A * 11/1996
JP 2006-077648 3/2006
(Continued)

OTHER PUBLICATIONS

Korean Office Action, dated Jun. 5, 2017, issued in the corresponding Korean Patent Application No. 10-2016-0041602.

*Primary Examiner* — Lindsay M Low
*Assistant Examiner* — Anthony L Bacon
(74) *Attorney, Agent, or Firm* — Brinks Gilson & Lione

(57) ABSTRACT

An air intake structure for a vehicle engine includes: a variable flap rotatably provided in an intake air passage so as to control a cross-sectional area of intake air flow; a port plate provided to a downstream of the variable flap, and generating displacement in cooperation with the variable flap; a driving unit supplying a driving force for generating displacement of both the variable flap and the port plate; and a controller determining a rotation angle of the variable flap in accordance with an operating range of an engine, and controlling the rotation angle of the variable flap by driving the driving unit.

10 Claims, 4 Drawing Sheets

(51) Int. Cl.
*F02D 41/00* (2006.01)
*F02B 31/04* (2006.01)

(52) U.S. Cl.
CPC ............... *F02M 35/10262* (2013.01); *F02D 2041/0015* (2013.01); *Y02T 10/146* (2013.01)

(58) Field of Classification Search
USPC ........................................................ 123/434
See application file for complete search history.

(56) References Cited

U.S. PATENT DOCUMENTS

| | | | | |
|---|---|---|---|---|
| 6,874,465 B2* | 4/2005 | Arimatsu | ............... | F02B 31/04 123/188.14 |
| 7,128,050 B1* | 10/2006 | Abe | ............... | F02B 31/06 123/306 |
| 7,322,333 B2* | 1/2008 | Isaji | ............... | F02B 31/06 123/184.51 |
| 2006/0048738 A1* | 3/2006 | Isaji | ............... | F02B 31/06 123/184.56 |
| 2014/0165959 A1* | 6/2014 | Han | ............... | F01L 1/267 123/306 |
| 2014/0165960 A1* | 6/2014 | Han | ............... | F02B 31/04 123/306 |
| 2014/0261319 A1* | 9/2014 | Kimura | ............... | F02P 15/08 123/406.45 |

FOREIGN PATENT DOCUMENTS

| | | |
|---|---|---|
| JP | 2010-071190 | 4/2010 |
| JP | 2011-012617 | 1/2011 |
| KR | 10-1993-0013432 | 7/1993 |
| KR | 10-1997-0001923 | 1/1997 |
| KR | 10-2011-0121073 | 11/2011 |

\* cited by examiner

AIR INTAKE STRUCTURE FOR VEHICLE ENGINE

CROSS REFERENCE TO RELATED APPLICATION

The present application claims priority to and the benefit of Korean Patent Application No. 10-2016-0041602, filed on Apr. 5, 2016, which is incorporated herein by reference in its entirety.

FIELD

The present disclosure generally relates to an air intake structure for a vehicle engine.

BACKGROUND

The statements in this section merely provide background information related to the present disclosure and may not constitute prior art.

Generally, in an air intake structure for a vehicle engine, a variety of technologies relating to injecting methods for fuel, control methods for intake air, and structures of an intake port have been developed and applied in order to improve gas mileage, and so on.

Of the technologies mentioned above, there is a technology that improves the performance of mixing the fuel flowing in the combustion chamber with the intake air such that the mixture component has a uniform concentration, thereby increasing the combustion efficiency of engine. For example, the technology for improving the fuel-air mixing performance is to control the intake air flow and to induce a tumble phenomenon of the intake air that flows in the combustion chamber.

The tumble phenomenon refers to a phenomenon where the intake air flowing in the combustion chamber creates turbulence to be swallowed from the upper portion of the combustion chamber toward the lower portion thereof. By the tumble phenomenon, the fuel-air mixing performance in the combustion chamber is improved by the swirling intake air, and thereby the combustion efficiency is increased.

SUMMARY

The present disclosure provides an air intake structure for a vehicle engine configured such that by controlling the intake air flow through multiple stages in response to a driving condition of a vehicle, a tumble phenomenon is induced, or the flow load of the intake air is controlled, thereby improving combustion efficiency.

In one form, the present disclosure provides an air intake structure for a vehicle engine, the air intake structure including: a variable flap rotatably provided in an intake air passage so as to control a cross-sectional area of intake air flow; a port plate coupled to a downstream rear end of the variable flap, and generating displacement in cooperation with the variable flap; a driving unit supplying a driving force for generating displacement of both the variable flap and the port plate; and a controller determining a rotation angle of the variable flap in accordance with an operating range of an engine, and controlling the rotation angle of the variable flap by driving the driving unit.

The variable flap may be configured such that an upstream front end thereof is in close contact with an inner wall of the intake air passage so as to form a rotation shaft, and the downstream rear end thereof rotates around the front end.

The port plate may be configured such that a rear end thereof facing a combustion chamber is in close contact with the inner wall of the intake air passage so as to form a rotation shaft, and a front end thereof facing the variable flap generates a rotational displacement relative to the rear end of the variable flap.

The port plate may be configured such that the front end thereof facing the variable flap is rotatably coupled to the rear end of the variable flap such that the rotational displacement is generated by a rotation of the variable flap.

The port plate may be configured such that the rear end thereof slides in a longitudinal direction of the intake air passage in response to a variation in the rotation angle of the variable flap.

The port plate may be configured to move in a straight line along a direction perpendicular to a direction of the intake air flow.

The port plate may be configured such that a front end thereof facing the variable flap is rotatably coupled to the rear end of the variable flap so as to move in a straight line by a rotation of the variable flap.

The controller may control the displacement of the port plate such that a front end of the port plate facing the variable flap is placed at a same height as the rear end of the variable flap facing the port plate.

The variable flap and the port plate may be provided to be in close contact with an inner wall of the intake air passage; and the controller may control the driving unit when the operating range of the engine falls into a high velocity range, such that the variable flap and the port plate are brought into close contact with the inner wall of the intake air passage.

The controller may determine the rotation angle of the variable flap such that as the operating range of the engine approaches a low velocity range, the cross-sectional area of intake air flow passing by the variable flap is reduced.

The controller may be configured to store predetermined rotation angles associated with sections of the engine operating range, and configured to determine a rotation angle among the stored rotation angles based on a current operating range of the engine and control the variable flap according to the determined rotation angle.

The air intake structure for a vehicle engine configured as described above is capable of improving combustion efficiency by inducing a tumble phenomenon or by controlling the flow load of the intake air, through controlling the intake air flow in multiple stages in response to a driving condition of a vehicle.

In particular, the variable flap and the port plate are provided to generate displacement, and the displacement is controlled by the controller in response to the engine operating range, thereby enhancing combustion efficiency in response to a current engine operating range.

Further, the port plate is configured to rotate along with the variable flap or to move in the straight line, thereby efficiently stabilizing the intake air that flowing through the flow route that is controlled by the variable flap. Thus, the air intake structure is advantageous in that a tumble phenomenon is efficiently induced.

Meanwhile, the variable flap and the port plate are provided to be in close contact with the inner wall of the intake air passage; and the controller controls the driving unit when the operating range of the engine falls into a high velocity range, such that the variable flap and the port plate are brought into close contact with the inner wall of the intake air passage, thereby reducing the resistance of the intake air flow, and thus increasing the combustion efficiency.

Further, the front end of the port plate is rotatably connected to the rear end of the variable flap. Thereby, when the variable flap rotates, it is possible to generate displacement by being supplied with the displacement without using an additional driving unit. Thus, the air intake structure is advantageous in design.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
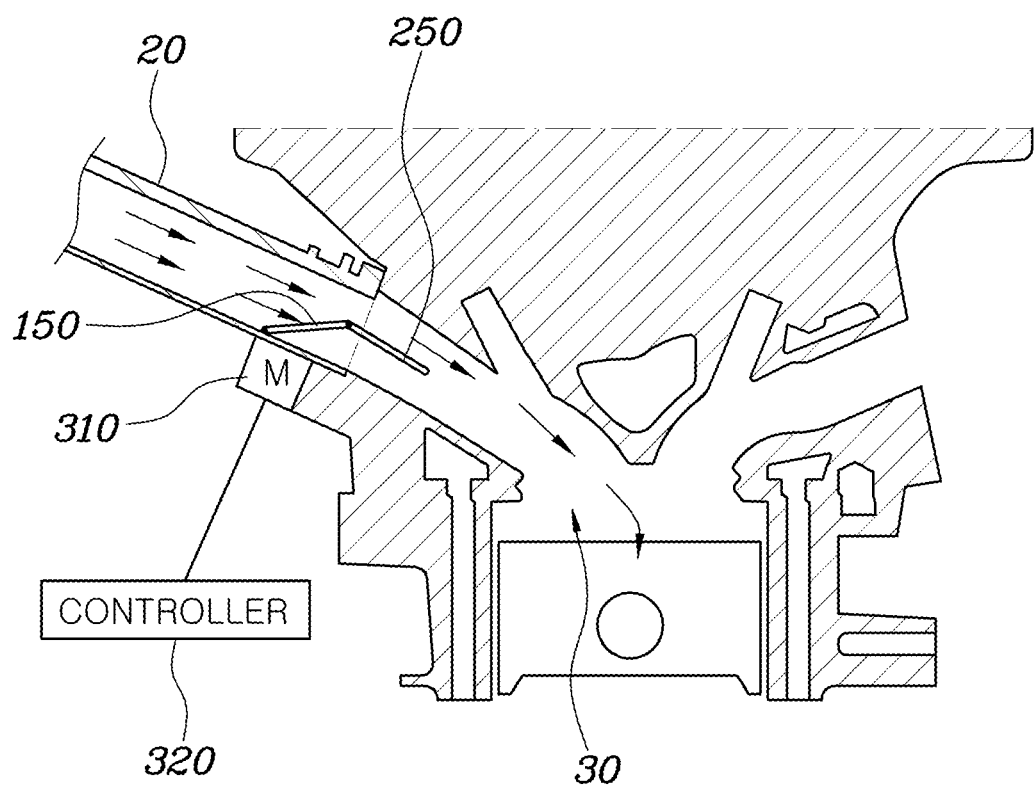
FIG. 1 is a view illustrating an air intake structure for a vehicle engine.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As shown in FIGS. 1 to 4, an air intake structure for a vehicle engine according to the present disclosure includes: a variable flap 150 rotatably provided in an intake air passage 20 so as to control a cross-sectional area of intake air flow; a port plate 250 coupled to a downstream rear end of the variable flap 150, and generating displacement in cooperation with the variable flap 150; a driving unit 310 supplying a driving force for generating displacement of both the variable flap 150 and the port plate 250; and a controller 320 determining a rotation angle of the variable flap 150 in accordance with an operating range of an engine, and controlling the rotation angle of the variable flap 150 by driving the driving unit 310.

To be more specific, the variable flap 150 is rotatably provided in the intake air passage 20 so as to control the cross-sectional area of intake air flow. FIGS. 1 to 4 are views illustrating the state where the variable flap 150 is mounted to the intake air passage 20. In the present disclosure, the intake air passage 20 refers to an intake port or an intake manifold.

The variable flap 150 is in a planar shape having a size corresponding to a cross-sectional area of the intake air passage 20, and is rotatably mounted to the intake air passage so as to control the cross-sectional area of intake air flow. A rotation shaft of the variable flap may be determined in a variety of directions. In one form, the rotation shaft may be set in a direction perpendicular to a flow direction of the intake air, while dividing the intake air passage 20 into an upper portion and a lower portion.

The engine may have increased combustion efficiency as the fuel-air mixing performance in the combustion chamber 30 is improved. To achieve this, the present disclosure induces a tumble phenomenon in the combustion chamber 30 by using the variable flap 150.

A tumble phenomenon refers to a phenomenon where the intake air flowing in the combustion chamber 30 creates a tumbling turbulence from the upper portion of the combustion chamber 30 toward the lower portion thereof. The fuel-air mixing performance in the combustion chamber 30 is improved by the tumbling intake air, and thereby the combustion efficiency is increased.

In other words, the variable flap 150 rotates to control the cross-sectional area of intake air flow in the intake air passage 20, and the intake air passing through the controlled cross-sectional area of flow has an increased velocity of flow, thereby tumbling while flowing from an upper portion of the combustion chamber 30 to a lower portion thereof.

FIGS. 1 to 4 are views illustrating the variable flap 150 for concentrating the intake air flow on the upper portion of the intake air passage 20.

Meanwhile, the port plate 250 is mounted to the downstream rear end of the variable flap 150, and is provided to generate the displacement in cooperation with the variable flap 150. In one form, the port plate 250 has the same width as the intake air passage 20, and is formed into a planar shape that extends toward the flow direction of the intake air.

The intake air concentrated by the variable flap 150 diffuses again after passing by the variable flap 150, wherein when the diffusion of the intake air occurs at a location well ahead of an inlet of the combustion chamber 30, the function of the variable flap 150 may be undermined.

Thus, the port plate 250 is configured to be mounted to the downstream rear end of the variable flap 150 so as to cooperate with the variable flap 150, thereby keeping the flow area of the intake air concentrated by the variable flap 150 at a predetermined level so as to allow the intake air to flow in the combustion chamber 30, and thus allowing the tumble phenomenon of the intake air to be effectively induced.

Further, as described hereinbelow, a displacement level of the port plate 250 corresponds to a rotation level of the variable flap 150, and thereby it is possible to efficiently satisfy the displacement level desired to raise the combustion efficiency by individually generating the displacement in response to the operating range of the engine.

FIGS. 1 to 4 are views illustrating states where the port plate 250 according to a variety of forms is mounted to the intake air passage 20.

Meanwhile, the driving unit 310 is provided to supply a driving force for generating displacement of both the variable flap 150 and the port plate 250. The driving unit 310 may be provided in a variety of manners, such as a hydraulic manner or a motorized manner, wherein respective motors for driving the variable flap 150 and the port plate 250 may be provided, or a single motor may be provided to drive both the variable flap and the port plate through a link structure.

In the present disclosure, in one form, the driving unit 310 is configured to be a motor so as to control the rotation angle of the variable flap 150, and is configured to be provided on the outer wall of the intake air passage 20 so as to transmit the driving force to the variable flap 150 or to the port plate 250. FIG. 1 is a schematic view of the form of the present disclosure.

Meanwhile, the controller 320 is provided to determine a rotation angle of the variable flap 150 in accordance with an operating range of the engine, and provided to control the rotation angle of the variable flap 150 by driving the driving unit 310. The operating range of the engine may be divided based on a variety of factors, such as the engine RPM, the driving speed of a vehicle, or the quantity of the intake air. In one aspect, the operating range of the engine may be divided according to whether the engine is in the high-speed driving condition or the low-speed driving condition by the driving speed of a vehicle.

Further, in another form, the rotation angle of the variable flap 150 refers to an angle of a longitudinal direction of the rotated variable flap 150 relative to the flow direction of the intake air, wherein the larger the rotation angle is, the more the cross-sectional area of intake air flow is reduced.

The controller 320 determines a control level of the cross-sectional area of the intake air flow by the variable flap 150 in response to the operating range of the engine, thereby rotating the variable flap 150 to satisfy a currently desired flow area of the intake air.

For example, when the operating range of the engine falls into a low velocity range, fuel consumption is decreased. Thus, improving the fuel-air mixture level in the combustion chamber 30, rather than the volume of the intake air, is important to increase the combustion efficiency. Thus, the cross-sectional area of the intake air flow is considerably reduced by making the rotation angle of the variable flap 150 large, thereby increasing the concentration level and the velocity of the intake air so as to intensely induce the tumble phenomenon in the combustion chamber 30 in the low velocity range.

Here, the larger the rotation angle of the variable flap 150 is, the higher the concentration level of the intake air is. Thus, when the velocity of the intake air flowing in through the inlet of the combustion chamber 30 is increased, the intensity of the tumble effect may be increased.

On the other hand, when the operating range of the engine falls into a high velocity range, turbulence in the combustion chamber 30 is sufficiently created by the rapid reciprocation motion of a piston, and the volume of air intake is considerably increased in response to the increase in the fuel consumption. Thus, the tumble phenomenon is considerably reduced by controlling the rotation angle of the variable flap 150 at a small degree whereas the volume of the air intake is increased by reducing the resistance of the intake air.

The method for determining the intake air flow area in response to the operating range of the engine may be determined in consideration of variety factors, such as an engine design, and operating strategy of a vehicle.

In the present disclosure, the controller 320 determines a rotation angle of the variable flap 150 in consideration of a level of the tumble phenomenon induction and the desired volume of the intake air in the combustion chamber 30 in response to the operating range of the engine, and rotates the variable flap 150 by driving the driving unit 310, thereby controlling the variable flap 150 to achieve desired combustion efficiency in response to the operating range of the engine.

Meanwhile, as shown in FIGS. 1 to 4, in the air intake structure for a vehicle engine according to the forms of the present disclosure, the variable flap 150 is configured such that an upstream front end 152 thereof is in close contact with an inner wall of the intake air passage 20 so as to form a rotation shaft, and the downstream rear end 154 thereof rotates around the front end 152.

To be more specific, the upstream front end 152 of the variable flap 150 is in close contact with the inner wall of the intake air passage 20. In another form, the upstream front end 152 is provided to be in close contact with a bottom surface of the intake air passage 20. Further, the front end 152 is hingedly connected to the intake air passage 20 so as to form the rotation shaft of the variable flap 150, and the rear end 154 facing the port plate 250 is provided to rotate around the front end 152.

Thus, when the rotation angle of the variable flap 150 is increased, the intake air is concentrated on and flows through a location opposite to a location of the inner wall of the intake air passage 20 (i.e., the area not blocked by the variable flap 150), on which the front end 152 of the variable flap 150 is disposed. In one form, the front end 152 of the variable flap 150 is in close contact with the bottom surface of the intake air passage 20, whereby when the variable flap 150 rotates, the intake air is concentrated on the upper portion of the intake air passage 20 and flows in the combustion chamber 30 thus causing the tumble phenomenon.

Further, in the case where the quantity of flow of the intake air is desired to be maximized, the variable flap 150 may be brought into close contact with the inner wall of the intake air passage 20, and thereby the resistance of the intake air flow is reduced.

Figure 2:
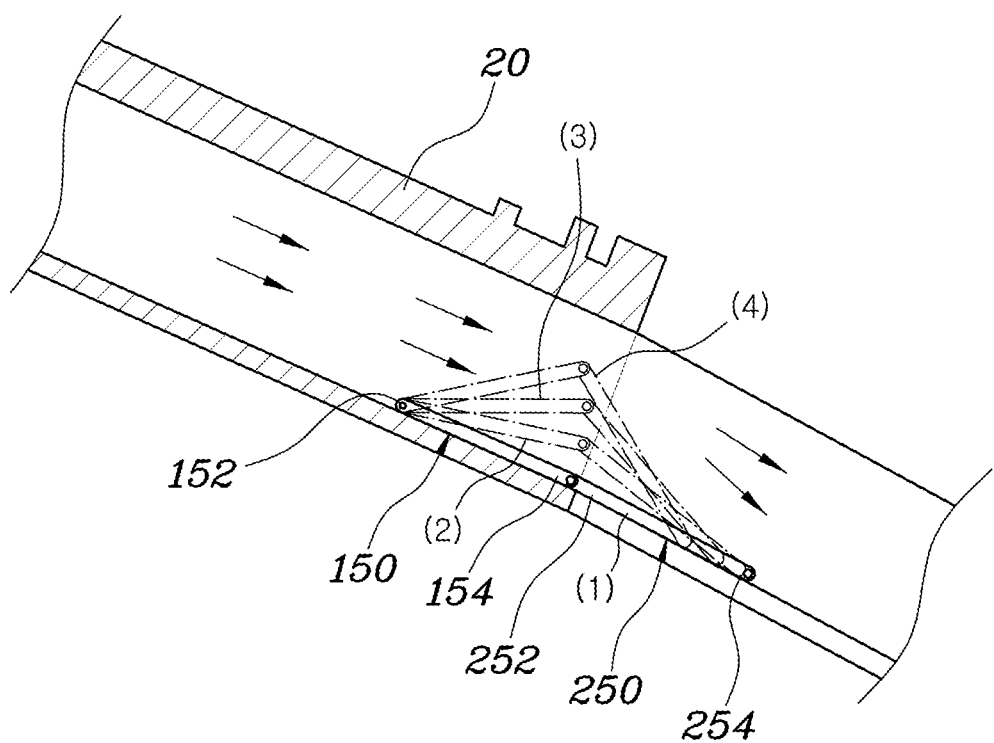
FIG. 2 is a view illustrating an operating state of a port plate rotatably provided in the air intake structure for a vehicle engine.
Figure 3:
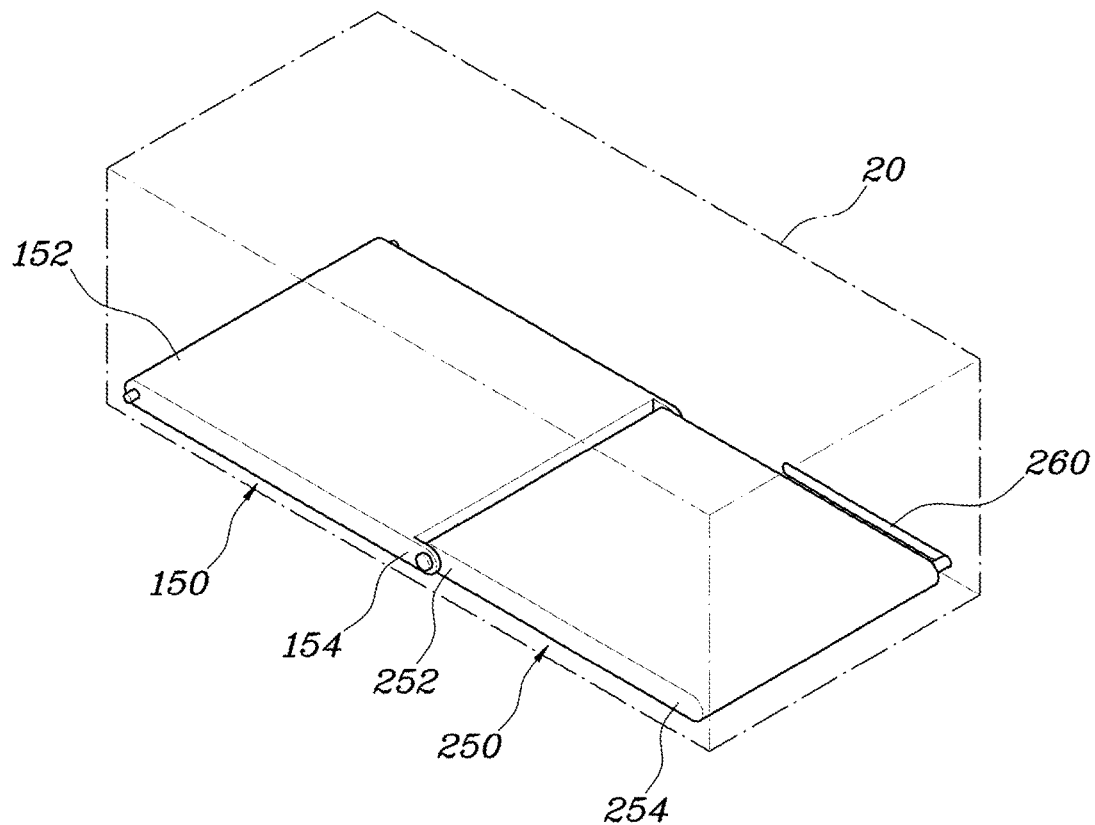
FIG. 3 is a view illustrating a variable flap and the port plate of the air intake structure for a vehicle engine shown in FIG. 2.

Meanwhile, as shown in FIGS. 2 and 3, the port plate 250 has a rear end 254 and a front end 252. The rear end 254 facing a combustion chamber 30 is in close contact with the inner wall of the intake air passage 20 so as to form a rotation shaft, and the front end 252 facing the variable flap 150 generates a rotational displacement based on the rear end 254.

To be more specific, the port plate 250 is provided at the downstream rear end of the variable flap 150 such that the rear end 254 thereof faces the combustion chamber 30, and the rear end 254 is provided to be in close contact with the inner wall of the intake air passage 20, and, in another form, provided to be in close contact with the bottom surface of the intake air passage 20. FIGS. 2 and 3 are views illustrating the state mentioned above.

The rear end 254 of the port plate 250 may maintain a close contact with the inner wall or the bottom surface of the intake air passage 20, and the front end 252 facing the variable flap 150 is configured to rotate around the rear end 254 and toward the upper portion of the intake air passage 20.

In one form, the rotation level of the port plate 250 is determined based on the rotation level of the variable flap 150 such that the intake air concentrated by the variable flap 150 flows along the port plate 250 and then flows in the combustion chamber 30. For example, if the variable flap 150 rotates with a high angle, then the port plate 250 also rotates with a high angle.

Further, the port plate 250 may be rotated by an additional motor, or rotated by a link driven by a motor that supplies the driving force to the variable flap 150, or rotated directly by the driving force originated from the variable flap 150.

Referring to FIGS. 2 and 3, while the dense intake air by the rotation of the variable flap 150 flows toward the inlet of the combustion chamber 30, the port plate 250 is rotated such that the concentration level of the intake air remains stable, thereby increasing the level of the tumble phenomenon induction in the combustion chamber 30.

Meanwhile, as shown in FIGS. 2 and 3, the front end 252 facing the variable flap 150 is rotatably coupled to the rear end 154 of the variable flap 150 such that the rotational displacement is generated by the rotation of the variable flap 150.

To be more specific, the rear end 154 of the variable flap 150 and the front end 252 of the port plate 250, which face each other, are hingedly connected to each other. Thereby, when the variable flap 150 rotates, the rotational displacement thereof is transmitted to the port plate 250, thereby rotating the port plate 250.

Thus, the port plate 250 is automatically rotated in response to the rotation level of the variable flap 150, thereby realizing the desired tumble effect without additional control, and is also advantageous in design because no additional device for driving the port plate 250 is required. In particular, FIG. 3 illustrates the state where the variable flap 150 and the port plate 250 are connected to each other and disposed in the intake air passage 20.

Meanwhile, as shown in FIGS. 2 and 3, the rear end 254 may slide in a longitudinal direction of the intake air passage 20 in response to a variation in the rotation angle of the variable flap 150.

In particular, the rear end 254 of the port plate 250 is hingedly connected to the inner wall of the intake air passage 20, and, in another form, connected to be in close contact with the bottom surface of the intake air passage. In another form, on both sides of the rear end 254 are provided with protrusions to be the rotation shaft, such that the protrusions are hingedly connected to the inner wall of the intake air passage 20 by being inserted thereinto and connected thereto.

Here, according to the form of FIGS. 2 and 3, the front end 252 of the port plate 250 is connected to the rear end 154 of the variable flap 150 such that the port plate 250 rotates in sync with the rotation of the variable flap 150, whereby a distance between the rear end 154 of the variable flap 150 and the rear end 254 of the port plate 250 is variable.

In order to satisfy a variation in the distance, a location of the front end 252 or the rear end 254 of the port plate 250 should be variable. Thus, according to the form of FIGS. 2 and 3, the port plate 250 is configured such that the rear end 254 thereof slides along a longitudinal direction of the intake air passage 20.

The front end 252 of the port plate 250 and the rear end 154 of the variable flap 150 may be connected each other in a manner that allows sliding each other, however, in this form, when the variable flap 150 rotates, the variable flap 150 or the port plate 250 may protrude from a junction part of the front end 252 and the rear end 154, thereby deteriorating the intake air flow. Thus, the form of FIGS. 2 and 3 is configured such that the rear end 254 of the port plate 250 slides.

To achieve this, the intake air passage 20 may be provided with a slide channel 260 on the inner wall thereof, and the rear end 254 of the port plate 250 is provided a protrusion at opposite sides thereof for being engaged with the slide channel 260 such that the protrusion slides along the slide channel 260.

As illustrated in FIGS. 2 and 3, the variable flap 150 and the port plate 250 are connected to each other, and the rear end 254 of the port plate 250, as the rotation shaft, slides so as to satisfy a variation in distance between the rear end 254 of the port plate 250 and the rear end 154 of the variable flap 150, which is generated when the variable flap 150 rotates.

Figure 4:
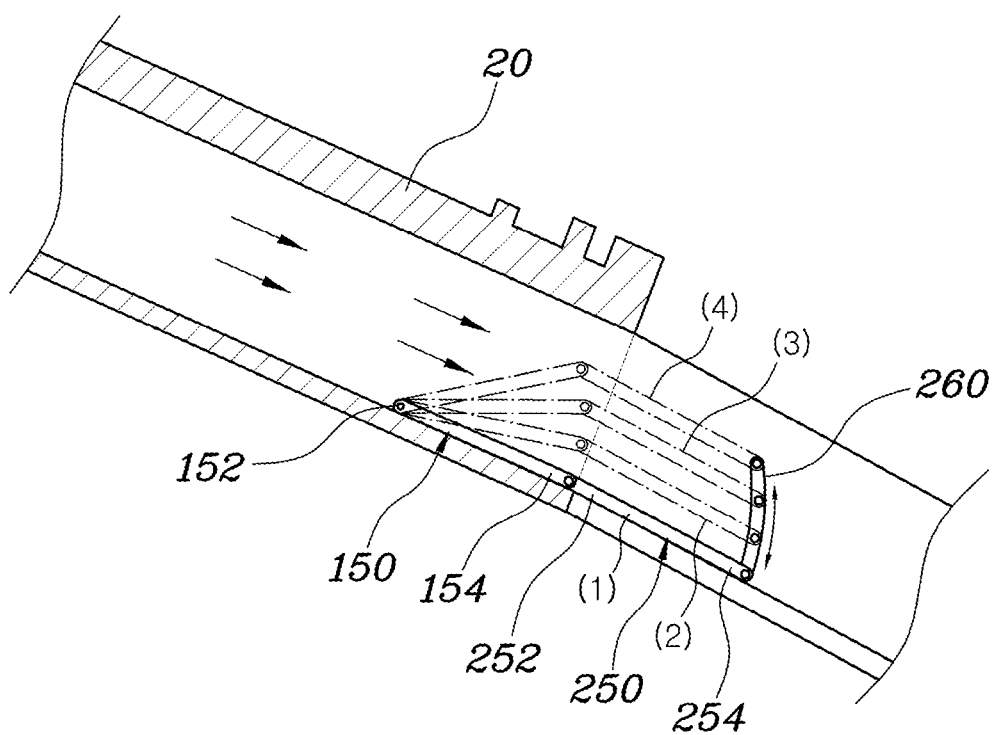
FIG. 4 is a view illustrating an operating state of the port plate provided to move in a straight line in the air intake structure for a vehicle engine.

In another form, as shown in FIG. 4, the port plate 250 may move in a straight line along a direction perpendicular to a direction of the intake air flow.

To be more specific, the front end 252 and the rear end 254 move in the straight line parallel to each other so as to generate linear displacement in response to the rotation of the variable flap 150. In one form, the level of displacement generated by the port plate 250 is set to correspond to a height of the rear end 154 of the variable flap 150. FIG. 4 shows the port plate 250 according to the form of FIG. 4.

In order for the port plate 250 to move in a straight line, the driving unit 310 may include motors for driving the variable flap 150 and the port plate 250, respectively, or a motor driving the variable flap 150 connected to the port plate through a link structure such that the port plate 250 rises and falls.

According to the form of FIG. 4, the entire port plate 250 rises and falls, and thus when the flow area of the intake air is reduced by the variable flap 150, the reduced flow area may remain constant throughout the entire port plate 250. Thus, the present disclosure is advantageous in concentrating the intake air flowing in the combustion chamber 30.

Referring to FIG. 4, the port plate 250 is configured such that the front end 252 facing the variable flap 150 is rotatably coupled to the rear end 154 of the variable flap 150 so as to move in the straight line as the variable flap 150 rotates.

To be more specific, when the rear end 154 of the variable flap 150 rotates around the front end 152 of the variable flap 150 and rises, the port plate 250 coupled to the rear end 154 of the variable flap 150 is also raised, along with the rear end of the variable flap, by the rotational displacement of the variable flap 150.

To achieve this, the intake air passage 20 may be provided with an elastic unit therein for allowing the port plate 250 to move in the straight line. In another form, the intake air passage 20 may be provided with the slide channel 260 thereon along the trajectory of the port plate 250 such that the port plate 250 moves in the straight line along the slide channel 260. In addition, various methods may be applied to induce the linear motion of the port plate 250.

In the form illustrated in FIG. 4, the port plate 250, particularly, rises and falls in a manner that the longitudinal direction of the port plate 250 is parallel with the flow direction of the intake air, and the height of the port plate 250 is controlled by being coupled to the rear end 154 of the variable flap 150. Thereby, it is possible to linearly move the port plate 250, without additional control, associated with the rise and fall of the rear end 154 of the variable flap 150 that is controlled based on the operating range of the engine, and thus the present disclosure is advantageous in efficiently concentrating the flow of the intake air.

Referring to FIG. 1, the controller 320 may control the displacement of the port plate 250 such that the front end 252 of the port plate 250 facing the variable flap 150 is placed at the same height as the rear end 154 of the variable flap 150 facing the port plate 250.

As described hereinbefore, in order to keep the flow of the intake air concentrated by the variable flap 150, the front end 252 may be placed at the same height as the rear end 154 of the variable flap 150, thereby promoting the stable flow of the intake air.

Thus, the controller 320 rotates the variable flap 150 by determining a rotation angle of the variable flap 150 in response to the operating range of the engine, and controls the displacement of the port plate 250 such that the front end 252 of the port plate 250 is placed at the same height as the rear end 154 of the variable flap 150.

In other form, the controller 320 may individually control the port plate 250 to regulate the level of the displacement thereof, or may control a rotation angle of the variable flap 150 such that the port plate 250 generates the displacement such that the front end 252 is automatically placed at the same height as the rear end 154 of the variable flap 150 by the physical connection.

As shown in FIGS. 1 to 4, the variable flap 150 and the port plate 250 may be in close contact with the inner wall of the intake air passage 20 when the operating range of the engine falls into the high velocity range. The controller 320 controls the driving unit 310 such that the variable flap 150 and the port plate 250 are brought into the close contact with the inner wall of the intake air passage 20.

As described hereinbefore, when the operating range of the engine falls into the high velocity range, as in the high-speed driving condition of a vehicle, the quantity of the intake air desired by the engine is considerably increased. Herein, in terms of the combustion efficiency, it is more advantageous to satisfy the desired quantity of the intake air than to enhance the tumble effect in the combustion chamber 30.

Since the presence of the variable flap 150 and the port plate 250 in the intake air passage 20 may cause a resistance to the flow of the intake air, the variable flap 150 and the port plate 250 are arranged to be in close contact with the inner wall of the intake air passage 20 in response to the control thereof.

Further, the controller 320 drives the driving unit 310 when the operating range of the engine falls into the high velocity range, such that the variable flap 150 and the port plate 250 are brought into close contact with the inner wall of the intake air passage 20, thereby reducing the possible resistance to the flow of the intake air toward the combustion chamber 30, and thus considerably increasing the quantity of the intake air.

The state of 1 shown in FIGS. 2 and 4 illustrates a controlled state where the variable flap 150 and the port plate 250 are brought into close contact with the inner wall (particularly, the bottom surface) of the intake air passage 20 when the operating range of the engine falls into the high velocity range.

Whether the engine is in the low velocity range or in the high velocity range may be determined based on the driving speed of a vehicle or the engine RPM, and the reference value for discriminating the range may be determined based on a variety of factors in terms of the control strategy.

Meanwhile, as shown in FIGS. 2 and 4, the controller 320 determines a rotation angle of the variable flap 150 such that as the operating range of the engine approaches the low velocity range, the cross-sectional area of the intake air flow passing by the variable flap 150 is reduced.

As described hereinbefore, when the operating range of the engine falls into the low velocity range, it is advantageous to induce the tumble phenomenon in the combustion chamber 30 in order to improve the combustion efficiency; on the contrary, when the operating range of the engine falls into the high velocity range, it is advantageous to reduce the resistance to the intake air in order to improve the combustion efficiency.

Thus, the controller 320 reduces the flow area of the intake air so as to increase the tumble phenomenon induction as the operating range of the engine approaches the low velocity range, and increases the flow area of the intake air so as to reduce the resistance to the intake air as the operating range of the engine approaches the high velocity range.

To achieve this, the controller 320 may judge the current operating range of the engine, and may be able to sequentially control a rotation angle of the variable flap 150 in response to the current operating range by sequentially determining a rotation angle of the variable flap 150 that is theoretically or experimentally predetermined.

Alternatively, the operating range of the engine may be divided into a plurality of sections from the low velocity range to the high velocity range based on the engine RPM, and so on, whereby it is possible to rotate the variable flap 150 by determining a rotation angle of the variable flap 150 in response to a corresponding section.

Besides the above example, a determination relation between the operating range of the engine and the rotation angle of the variable flap 150 may be determined in a variety of manners in terms of engine design and control strategy by those skilled in the art.

FIGS. 2 and 4 illustrate a variation in the rotation angle of the variable flap 150. The state of "(4)" shown in FIGS. 2 and 4 illustrates a state where the operating range of the engine is in the low velocity range, and the flow area of the intake air is minimized to enhance the tumble phenomenon induction. The state of "(1)" shown in FIGS. 2 and 4 illustrates the state where the operating range of the engine is in the high velocity range, and the resistance to the flow of the intake air is minimized to inhibit or prevent the quantity of the intake air flowing in the combustion chamber 30 from being reduced. States "(2) and (3)" shown in FIGS. 2 and 4 illustrate states where the operating range of the engine is in the medium velocity range between the low velocity range and the high velocity range, and as the operating range of the engine approaches the low velocity range, the flow area of the intake air is controlled to be reduced.

When the engine operating range is divided into sections, the criteria of division of each section may be determined in a variety of manners in terms of control design.

Meanwhile, in the air intake structure for a vehicle engine according to the forms of the present disclosure, the controller 320 is previously stored with rotation angles by sections of the engine operating range, and controls the variable flap 150 to form a rotation angle of a section, into which the current operating range of the engine falls.

As described hereinbefore, according to the forms of the present disclosure, by dividing the engine operating range into sections, the rotation angles by sections of the engine operating range are previously stored in the controller 320, and the controller 320 controls the variable flap 150 to form a rotation angle of a section, into which the current operating range of the engine falls.

Thus, it is not required to frequently determine a rotation angle in response to the operating range of the engine, and thereby it is possible to inhibit or prevent performance of response to controlling the variable flap 150 from being lowered. Further, the present disclosure is advantageous in that it is possible to facilitate the determination of a rotation angle, in which the more important factor between the combustion efficiency and the engine performance in terms of control strategy is previously reflected.

Although forms of the present disclosure have been described for illustrative purposes, those skilled in the art will appreciate that various modifications, additions and substitutions are possible, without departing from the scope and spirit of the present disclosure.

What is claimed is:
1. An air intake structure for a vehicle engine, the air intake structure comprising:
    a variable flap rotatably provided in an intake air passage so as to control a cross-sectional area of intake air flow;

a port plate provided downstream of the variable flap, and generating displacement in cooperation with the variable flap;

a driving unit configured to supply a driving force for generating displacement of both the variable flap and the port plate; and a controller configured to determine a rotation angle of the variable flap in accordance with an operating range of an engine, and configured to control the driving unit so as to control the rotation angle of the variable flap, wherein a rear end of the port plate facing a combustion chamber is configured to maintain a direct contact with an inner wall of the intake air passage while sliding in a longitudinal direction of the intake air passage in response to a variation in a rotation angle of the variable flap, wherein a front end of the port plate coupled to the variable flap is configured to generate a rotational displacement relative to a downstream rear end of the variable flap, and wherein a slide channel is formed in a bottom section of the inner wall of the intake air passage in the longitudinal direction of the intake air passage, and the rear end of the port plate is provided with a protrusion at opposite sides thereof for being engaged with the slide channel such that the protrusion slides along the slide channel in the longitudinal direction of the intake air passage.

2. The air intake structure of claim 1, wherein an upstream front end of the variable flap is in close contact with the inner wall of the intake air passage, and the downstream rear end of the variable flap rotates around the upstream front end.

3. The air intake structure of claim 1, wherein the front end of the port plate is rotatably coupled to the downstream rear end of the variable flap such that the rotational displacement is generated by a rotation of the variable flap.

4. The air intake structure of claim 2, wherein the port plate is configured to move in a straight line along a direction perpendicular to a direction of the intake air flow.

5. The air intake structure of claim 4, wherein a front end of the port plate, facing the variable flap, is rotatably coupled to the downstream rear end of the variable flap so as to move in a straight line by a rotation of the variable flap.

6. The air intake structure of claim 2, wherein the controller controls the displacement of the port plate such that a front end of the port plate facing the variable flap is placed at a same height as the downstream rear end of the variable flap is placed.

7. The air intake structure of claim 1, wherein the variable flap and the port plate are provided to be in close contact with the inner wall of the intake air passage, and the controller controls the driving unit when the operating range of the engine falls into a high velocity range, such that the variable flap and the port plate are brought into close contact with the inner wall of the intake air passage.

8. The air intake structure of claim 1, wherein the controller determines the rotation angle of the variable flap such that as the operating range of the engine approaches a low velocity range, the cross-sectional area of intake air flow passing by the variable flap is reduced.

9. The air intake structure of claim 1, wherein the controller is configured to store predetermined rotation angles associated with sections of the engine operating range, and configured to determine a rotation angle among the stored rotation angles based on a current operating range of the engine and control the variable flap according to the determined rotation angle.

10. The air intake structure of claim 9, wherein the operation range of the engine is determined based on at least one of revolutions per minute (RPM) of the engine, a driving speed of the vehicle, or a quantity of the intake air.

* * * * *